US012739883B2

(12) United States Patent
Niu et al.

(10) Patent No.: US 12,739,883 B2
(45) Date of Patent: Sep. 15, 2026

(54) CHANNEL MEASUREMENT CONFIGURATION AND REPORTING

(71) Applicant: ZTE Corporation, Guangdong (CN)

(72) Inventors: Li Niu, Guangdong (CN); Yajun Zhao, Guangdong (CN)

(73) Assignee: ZTE Corporation, Shenzhen Guangdong (CN)

( * ) Notice: Subject to any disclaimer, the term of this patent is extended or adjusted under 35 U.S.C. 154(b) by 654 days.

(21) Appl. No.: 17/212,524

(22) Filed: Mar. 25, 2021

(65) Prior Publication Data

US 2021/0212121 A1 Jul. 8, 2021

Related U.S. Application Data

(63) Continuation of application No. PCT/CN2018/109050, filed on Sep. 30, 2018.

(51) Int. Cl.

| | |
|---|---|
| ***H04W 36/00*** | (2009.01) |
| ***H04W 24/08*** | (2009.01) |
| ***H04W 48/20*** | (2009.01) |
| ***H04W 74/00*** | (2009.01) |
| ***H04W 74/0816*** | (2024.01) |

(52) U.S. Cl.
CPC ....... *H04W 74/0816* (2013.01); *H04W 24/08* (2013.01); *H04W 48/20* (2013.01); *H04W 74/002* (2013.01)

(58) Field of Classification Search
None
See application file for complete search history.

(56) References Cited

U.S. PATENT DOCUMENTS

| | | | | |
|---|---|---|---|---|
| 9,185,610 | B2 * | 11/2015 | Gulati | H04W 48/18 |
| 9,629,050 | B2 * | 4/2017 | Siomina | H04W 36/0085 |
| 10,051,535 | B2 * | 8/2018 | Cui | H04W 36/38 |
| 11,178,605 | B2 * | 11/2021 | Geng | H04W 36/0027 |
| 11,736,997 | B2 * | 8/2023 | Yang | H04B 7/1851 370/331 |
| 2013/0028187 | A1 | 1/2013 | Aoyagi et al. | |
| 2013/0077515 | A1 | 3/2013 | Jung | |
| 2013/0095879 | A1 | 4/2013 | Gupta et al. | |

(Continued)

FOREIGN PATENT DOCUMENTS

| | | |
|---|---|---|
| CN | 101815330 A | 8/2010 |
| CN | 103988549 A | 8/2014 |

(Continued)

OTHER PUBLICATIONS

International Search Report and Written Opinion in International Application No. PCT/CN2018/109050, mailed May 30, 2019, 9 pages.

(Continued)

*Primary Examiner* — Sithu Ko
(74) *Attorney, Agent, or Firm* — Perkins Coie LLP

(57) ABSTRACT

A method of wireless communication includes transmitting, from a communication node, a message to a mobile device including information about a first transmission occasion. The information about the first transmission occasion indicates information about one or more additional transmission occasions. The method also includes performing, by the communication node, a subsequent transmission using either the first transmission occasion or the one of the one or more additional transmission occasions.

15 Claims, 5 Drawing Sheets

(56) References Cited

U.S. PATENT DOCUMENTS

| | | | | |
|---|---|---|---|---|
| 2013/0203419 | A1* | 8/2013 | Siomina | H04W 36/04 455/437 |
| 2014/0329529 | A1 | 11/2014 | Jung et al. | |
| 2015/0056925 | A1 | 2/2015 | Jung | |
| 2015/0057002 | A1* | 2/2015 | Lee | H04W 36/06 455/437 |
| 2015/0109918 | A1 | 4/2015 | Sharma | |
| 2015/0249951 | A1 | 9/2015 | Jung | |
| 2015/0304919 | A1 | 10/2015 | Jung et al. | |
| 2016/0050590 | A1* | 2/2016 | Ponukumati | H04W 36/00835 455/437 |
| 2016/0353347 | A1* | 12/2016 | Jun | H04L 1/1822 |
| 2017/0034745 | A1 | 2/2017 | Dhanapal et al. | |
| 2017/0064598 | A1 | 3/2017 | Jain et al. | |
| 2017/0208545 | A1 | 7/2017 | Siann | |
| 2017/0289875 | A1* | 10/2017 | Cui | H04W 36/38 |
| 2018/0192426 | A1* | 7/2018 | Ryoo | H04W 74/0833 |
| 2019/0191416 | A1 | 6/2019 | Xie et al. | |
| 2019/0364447 | A1* | 11/2019 | Bucknell | H04W 24/08 |
| 2020/0053620 | A1 | 2/2020 | Kim | |
| 2020/0120592 | A1* | 4/2020 | Geng | H04W 76/30 |
| 2020/0177291 | A1* | 6/2020 | Fei | H04W 72/0453 |
| 2020/0221372 | A1 | 7/2020 | Shih | |
| 2020/0274597 | A1 | 8/2020 | Chen et al. | |
| 2021/0345210 | A1 | 11/2021 | Chen | |
| 2022/0183061 | A1* | 6/2022 | Wang | H04L 5/0044 |

FOREIGN PATENT DOCUMENTS

| | | | |
|---|---|---|---|
| CN | 104025655 | A | 9/2014 |
| CN | 106488492 | A | 3/2017 |
| CN | 107852672 | A | 3/2018 |
| CN | 107295522 | | 4/2018 |
| CN | 107888264 | A | 4/2018 |
| CN | 108282213 | | 7/2018 |
| CN | 108307502 | A | 7/2018 |
| RU | 2526887 | C2 | 8/2014 |
| WO | 2012/176010 | | 12/2012 |
| WO | 2017/075748 | | 5/2017 |
| WO | WO-2020067758 | A1 * | 4/2020 |

OTHER PUBLICATIONS

Huawei, et al. "Reliability enhancement for grant-free transmission" 3GPP TSG RAN WG1 Meeting #92bis, R1-1804296, Apr. 20, 2018 (Apr. 20, 2018), 6 pages.

Samsung, "Connected mobility aspects to support network slicing" 3GPP TSG-RAN WG2 NR #102 Meeting, R2-1808652, May 25, 2018 (May 25, 2018), 3 pages.

ZTE, "Enhanced UL grant-free transmissions" 3GPP TSG RAN WG1 Meeting #94, R1-1808213, Aug. 24, 2018 (Aug. 24, 2018), 6 pages.

Co-Pending CN Application No. 201880098261.8, Second Office Action dated Jun. 23, 2022, 14 pages with unofficial translation.

Huawei et al., "UCI transmission in NR operations in unlicensed," 3GPP TSG RAN WG1 #92bis, Sanya, China, R1-1803682, Apr. 16-20, 2018, 6 pages.

Co-Pending CN Application No. 201880098261.8, Notification to Grant Patent Right for Invention dated Oct. 18, 2022, 4 pages with unofficial translation.

Chinese Office Action for Application No. 201880098261.8, dated Jan. 18, 2022, 13 pages with unofficial translation.

Huawei, et al. "Repetition Enhancements for UL SPS Operation," 3GPP TSG RAN WG1 Meeting #93 R1-1805868, Busan, Korea, May 21-25, 2018, 6 pages.

Huawei, et al. "Transmission with configured grant in NR unlicensed band," 3GPP TSG RAN WG1 Meeting #93 R1-1805922, Busan, Korea, May 21-May 25, 2018, 7 pages.

European Extended Search Report for EP Application No. 18930288.8, dated Sep. 23, 2021, 8 pages.

MediaTek Inc., "Measurement Configuration with NR-SS and CSI-RS," 3GPP TSG-RAN WG2 Meeting #99 Berlin, Germany, Aug. 21-25, 2017, R2-1708005, 5 pages.

ZTE Corporation, Sane Chips, "Discussion on the configuration of the measurement object," 3GPP TSG-RAN WG2 Meeting #99bis Prague, Czech Republic, Oct. 9-13, 2017, R2-1710431, (revision of R2-1708113), 7 pages.

Co-Pending EP Application No. 18930288.8, Article 94 Communication dated Mar. 22, 2023, 7 pages.

CNIPA, First Office Action for Chinese Application No. 2022103769180, mailed on Dec. 6, 2022, 17 pages with unofficial translation.

CNIPA, Second Office Action for Chinese Application No. 2022103769180, mailed on Feb. 22, 2023, 9 pages with unofficial translation.

IPI, Examination Report for Indian Application No. 202117023901, mailed on Feb. 15, 2023, 9 pages.

Rospatent, Office Action for Russian Application No. 2021120033/07(042052), mailed on Apr. 27, 2022, 14 pages with unofficial translation.

Rospatent, Search Report for Russian Application No. 2021120033/07(042052), mailed on Apr. 26, 2022, 2 pages.

IPOS, Written Opinion for Singaporean Application No. 11202105546W, dated Jul. 17, 2023, 7 pages.

ZTE, "The impact of non-best cell on cell reselection for NR-U," 3GPP TSG RAN WG2 #104, Washington, USA, R2-1816834, Nov. 12-16, 2018, 3 pages.

ZTE, "The impact of multiple operators on cell selection for NR-U," 3GPP TSG RAN WG2 #103bis, Chengdu, China, R2-1813739, Oct. 8-12, 2018, 2 pages.

LG Electronics Inc., "Reading MIB/SIB1 from non-best cells," 3GPP TSG RAN WG2 #104, Spokane, USA, R2-1818329, Nov. 12-16, 2018, 2 pages.

MediaTek Inc., "Cell Selection and Reselection in NR-U," 3GPP TSG RAN2 #104, Spokane, USA, Tdoc R2-1816480, Nov. 12-16, 2018, 4 pages.

Extended European Search Report for European Patent Application No. 19908581.2 dated Apr. 20, 2022, 12 pages.

Co-Pending EP Application No. 18930288.8, Second Article 94 Communication dated Aug. 19, 2024 5 pages.

Co-Pending EP Application No. 18930288.8, Third Article 94 Communication dated Mar. 19, 2025, 5 pages.

Co-Pending EP Application No. 18930288.8, Intention to Grant dated Jun. 11, 2025, 8 pages.

Co-Pending EP Application No. 18930288.8, Second Intention to Grant dated Sep. 4, 2025, 8 pages.

* cited by examiner

CHANNEL MEASUREMENT CONFIGURATION AND REPORTING

CROSS-REFERENCE TO RELATED APPLICATIONS

This application is a continuation of International Patent Application No. PCT/CN2018/109050, filed on Sep. 30, 2018, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for configuring channel measurements and reporting measurement results to increase transmission reliability using contention-based protocols such as "Listen Before Talk" in the unlicensed spectrum.

In one example aspect, a wireless communication method is disclosed. The method includes transmitting, from a communication node, a message to a mobile device including information about a first transmission occasion. The information about the first transmission occasion indicates information about one or more additional transmission occasions. The method also includes performing, by the communication node, a subsequent transmission using either the first transmission occasion or the one of the one or more additional transmission occasions.

In another example aspect, a wireless communication method is disclosed. The method includes receiving, at a mobile device, a message from a communication node including information of a first transmission occasion. The information about the first transmission occasion indicates information of one or more additional transmission occasions. The method also includes receiving, by the mobile device, a subsequent transmission over either the first transmission occasion or the one of the one or more additional transmission occasions.

In another example aspect, a wireless communication method is disclosed. The method includes transmitting, by a communication node, information about multiple measurement resources to a mobile device. Wherein the information indicates, for each of the multiple measurement resources, at least a frequency at which a measurement to be performed, a bandwidth of the measurement, a number of symbols for the measurement, a period of the measurement, a duration of the measurement, or a start time of the measurement.

In another example aspect, a wireless communication method is disclosed. The method includes receiving, at a mobile device, information about multiple measurement resources from a communication node. The information indicates, for each of the multiple measurement resources, at least a frequency at which a measurement is to be performed, a bandwidth of the measurement, a number of symbols of the measurement, a period of the measurement, a duration of the measurement, or a start time of the measurement. The method includes performing measurements by the mobile device using the multiple measurement resources to obtain multiple measurement results. The method also includes determining, by the mobile device, one or more final results based on the multiple measurement results.

In yet another example aspect, a wireless communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Figure 1:
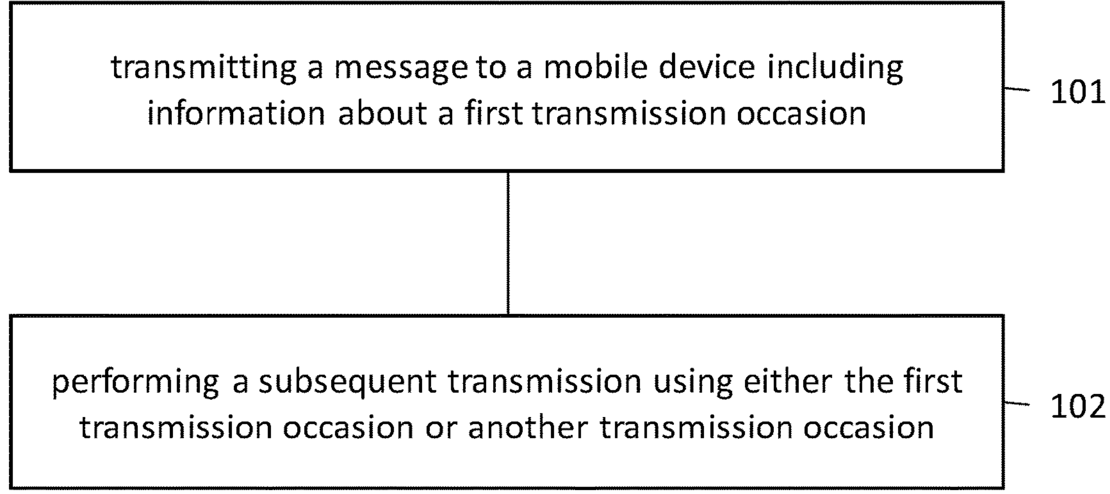
FIG. 1 is a flowchart representation of a method for wireless communication.

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

The amount of user data in the networks is growing rapidly as NR emerges in the wireless market. The rapid growth of the user data leads to a great demand for the spectrum. Currently, the licensed spectrum that is already assigned to network operators is getting to a saturation point. The use of the licensed spectrum also means high operating cost for the network operators. Therefore, more and more network operators are considering using unlicensed spectrum to increase their service offerings.

Unlike in the licensed spectrum, the mobile devices (also known as the user equipment or the terminals) gain access to the unlicensed spectrum through a contention-based protocol (e.g., "Listen Before Talk" (LBT)). To provide efficient communications using the unlicensed spectrum, different factors (e.g., signal quality, preemption probability, and/or interference level) are evaluated for different use scenarios, including handovers and node changes. Particularly, providing reliable connections and reducing communication delays are important factors to consider for the usage of the unlicensed spectrum.

The Long-Term Evolution (LTE) and NR communication systems are designed based on the licensed spectrum. Transmissions in the LTE or NR communication systems include signals such as synchronization signals, system information, and/or paging messages that use scheduled transmission resources. In the unlicensed spectrum, transmissions are less predictable. Thus, it can be difficult to ensure successful transmissions in the unlicensed spectrum based on the current design. This patent documents describes techniques that can be used in different embodiments to increase the likelihood of successfully transmissions of the synchronization signals, system information, and/or paging information, thereby improving the reliability of transmissions using contention-based protocols in the unlicensed spectrum.

Furthermore, in the NR communication systems, a wide carrier band can be divided into several smaller subsets, such as multiple Bandwidth Parts (BWPs). A BWP may include multiple channels. The existing measurement framework is designed based on having one frequency in the licensed spectrum. That is, each frequency of carrier band or BWP produces one measurement result. However, in the unlicensed spectrum, the LBT mechanism may cause different interferences due to channel sharing. This patent document further describes techniques that can be used in different embodiments to improve the measurement framework to account for different interferences over different channels in the unlicensed spectrum.

Some examples of the disclosed techniques are described in the following example embodiments.

Embodiment 1

Using the LBT mechanism, a user equipment (UE) or a communication node can sense the channel before attempting to access the network. For example, the UE or the communication node senses the channel within a particular bandwidth. If the UE or the communication node performs the LBT successfully, the UE or communication node gains channel access within the bandwidth and performs subsequent transmissions. However, if the LBT mechanism fails, the LBT failures may cause missing transmissions of synchronization signals or discovery signals, such as the Primary Synchronization Signal (PSS), Secondary Synchronization Signal (SSS), the Physical Broadcast Channel (PBCH) Demodulation Reference Signal (DMRS), and/or PBCH data. Such failures, therefore, can further cause difficulty or delay for the UE to get essential information such as the system information. Similarly, missing transmissions of paging information due to LBT failures may cause the difficulty or delay for the UE to access to the cell.

To address these problems, and others, multiple transmission occasions in multiple BWPs or channels can be configured and/or broadcasted by the communication node for transmitting the essential information such as the synchronization signals, discovery signals, system information, paging information, etc. to allow the UEs to access the network more reliably. If the LBT mechanism succeeds in only one BWP or one channel, the UE can obtain the necessary information to gain access to the network, thereby increasing the success rate of transmissions in the unlicensed spectrum.

FIG. 1 is a flowchart representation of a method 100 for wireless communication. The method 100 includes, at step 101, transmitting, from a communication node, a message to a mobile device including information about a first transmission occasion. The information about the first transmission occasion indicates information about one or more additional transmission occasions. The method also includes, at step 102, performing, by the communication node, a subsequent transmission using either the first transmission occasion or the one of the one or more additional transmission occasions.

Figure 2:
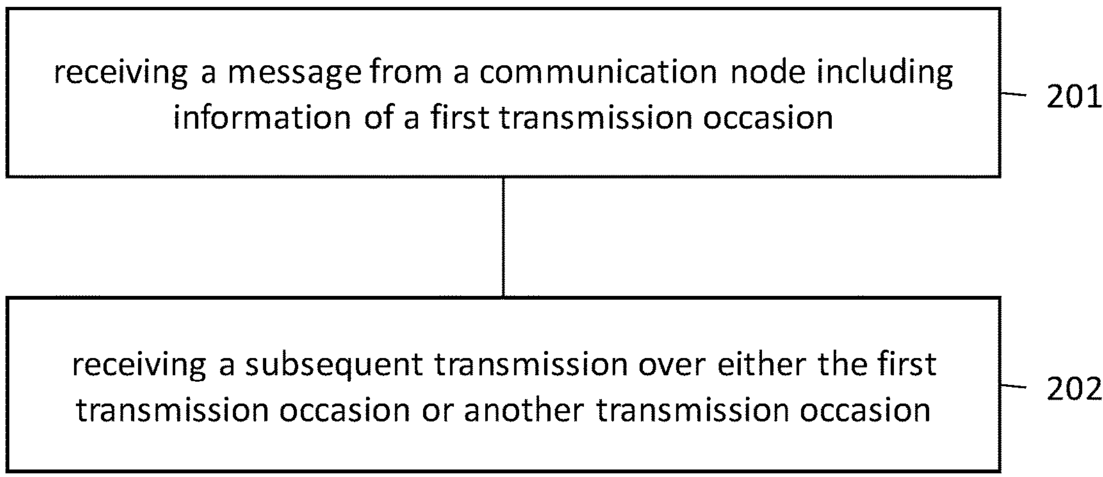
FIG. 2 is a flowchart representation of another method for wireless communication.

FIG. 2 is a flowchart representation of a method 200 for wireless communication. The method includes, at step 201, receiving, at a mobile device, a message from a communication node including information of a first transmission occasion. The information about the first transmission occasion indicates information of one or more additional transmission occasions. The method also includes, at step 202, receiving, by the mobile device, a subsequent transmission over either the first transmission occasion or the one of the one or more additional transmission occasions.

In some embodiments, a wireless communication node (e.g., a base station) can configure multiple transmission occasions for the synchronization signal, the discovery signal, the remaining minimum system information (RMSI), or the paging message. The multiple transmission occasions can locate in different channels and/or BWPs. In some embodiments, the wireless communication node can configure the multiple transmission occasions in a message, such as, a Radio Resource Control message, a Master Information Block (MIB) message, or a System Information Block Type 1 (SIB1) message. Information about each transmission occasion may include one or more of the following: the frequency, the period, the duration, or the start time of the transmission occasion.

For example, the message (e.g., a RRC message) can include information about multiple transmission occasions. As another example, the message (e.g., MIB) can include information about multiple Physical Downlink Control Channel (PDCCH) resources for the RMSI. As yet another example, the message (e.g., MIB or SIB1) can include formation about multiple PDCCH resources for the paging message. In some embodiments, information of each of the PDCCH resource may include one or more of the following: the frequency, the bandwidth, the number of symbols, the period, the duration, or the start time. Furthermore, in some embodiments, multiple PDCCH resources of other SIBs can be indicated in SIB1.

In some embodiments, the information about the first transmission occasion indicates information about one or more additional transmission occasions. For example, the frequency of at least a second transmission occasion can be indicated by an offset value included in the information transmitted in the first transmission occasion. In some implementations, information transmitted in the first transmission occasion can indicate information of additional transmission occasions (that is, information transmitted in the first transmission occasion further configures the additional transmission occasions). For example, the frequency of at least a second transmission occasion can be indicated by an offset value included in the information transmitted in the first transmission occasion.

The offset value in the above embodiments and/or implementations can be either a frequency offset between the frequency of the second transmission occasion and the frequency of the first transmission occasion, a frequency offset between the frequency of the second transmission occasion and a frequency of an associated synchronization signal or an associated discovery signal, or a frequency offset between the frequency of the second transmission occasion and a carrier frequency that the first transmission belong to. Alternatively, the absolute frequency value of the second transmission occasion can be indicated.

After the UE receives the information about the multiple transmission occasions, it may determine that it does not support the wide band. In some embodiments, the UE may select a subset of the multiple transmission occasions based on its capability. In some implementations, the wireless communication node indicates multiple subsets of the multiple transmission occasions and includes a corresponding UE category for each subset of the multiple transmission occasions in the message. After the UE receives the message, it may select a set based on its own category.

In some implementations, the wireless communication node includes the multiple transmission occasions in the message. After the UE receives the message, the UE determines the center frequency of the receiver and the frequency range next to the center frequency based on the supported bandwidth of the receiver. The UE then selects the set of transmission occasions next to the frequency range.

Embodiment 2

The UE can perform measurements, such as reference signal measurements or channel occupancy measurements, to evaluate the network conditions. For example, the UE can obtain the Received Signal Strength Indicator (RSSI) sample values that are the linear average of the total received power observed only in certain OFDM symbols of measurement time resources in the measurement bandwidth. The UE then can obtain the RSSI result through the average of sample values in an interval and obtain the channel occupancy result through the rounded percentage of the sample values that exceed a threshold to all the sample values in the interval. The RSSI and channel occupancy results can reflect the success rate of the LBT mechanism. For example, when the RSSI is high or the channel occupancy is high, it means that the probability of LBT failures may be high.

The interference and the LBT success rate can be different from each channel. In the current measurement framework, the RSSI and channel occupancy measurement only support results for one channel. To enable the selection of BWP(s), carrier(s), or cell(s), the current measurement framework needs to be extended to account for multiple channels and/or BWPs.

Figure 3:
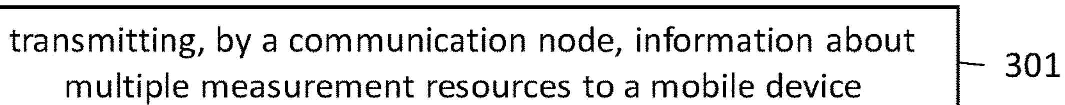
FIG. 3 is a flowchart representation of another method for wireless communication.

FIG. 3 is a flowchart representation of a method for wireless communications. The method 300 includes, at step 301, transmitting, by a communication node, information about multiple measurement resources to a mobile device. The information indicates, for each of the multiple measurement resources, at least a frequency at which a measurement to be performed, a bandwidth of the measurement, a number of symbols for the measurement, a period of the measurement, a duration of the measurement, or a start time of the measurement.

In some embodiments, a communication node (e.g., a base station) can configure the UE to perform measurements in multiple channels and/or BWPs and obtain a measurement result. For example, to assist the selection of the carrier or cell, the communication node can inform the UE multiple measurement resources located in different channels or BWPs. The communication node can also configure the UE to report some common measurement results obtained from multiple measurement resources. In some implementations, the communication node can configure the information of an intra-frequency and multiple inter-frequencies used by other cells. Each frequency can be associated with a frequency identity, a measurement object identity, or a measurement identity. Each frequency can include one or multiple measurement resources. Each measurement resource can include one or more of the following: the frequency, the measurement bandwidth, the number of symbols, the period, the duration, the start time, a cell identity, a channel identity, a resource identity, and/or a BWP identity. The frequency can be indicated by an offset value from the frequency of the measurement object, an offset value from the frequency of one of measurement resources, or an absolute frequency value.

In some embodiments, the communication node may configure one or more measurement objects for the UE. For example, each measurement object can be associated with a measurement resource. As another example, when the communication node configures one measurement object for the UE, the measurement object is associated with the multiple measurement resources.

In some embodiments, the communication node can determine the UE's report configuration (e.g., periodical reporting, event-triggered reporting, or network-triggered reporting). For example, network-triggered reporting enables the UE to report the measurement result only one time after the communication node sends a triggered report command, for example, via PDCCH, a Medium Access Control (MAC) Control Element (CE), or a RRC message. If the communication node needs a measurement result of a particular cell, a BWP, a frequency, or a channel, the communication node can indicate the corresponding cell (e.g., a cell identity), the corresponding BWP (e.g., a BWP identity), the corresponding frequency (e.g., a frequency identity, a measurement object identity, or a measurement identity), or a corresponding channel (e.g., a channel identity or a resource identity) in the triggered report command.

Periodical reporting or event-triggered reporting enables the UE to report the measurement result for a measurement object periodically or when measurement event is triggered. In some embodiments, if the communication node needs a measurement result of a particular cell or a BWP or a channel under a frequency, the communication node can indicate the corresponding cell (e.g., a cell identity), the corresponding BWP (e.g., a BWP identity), the corresponding channel (e.g., a channel identity or a resource identity) in the reporting configuration associated with the frequency or measurement object.

Figure 4:
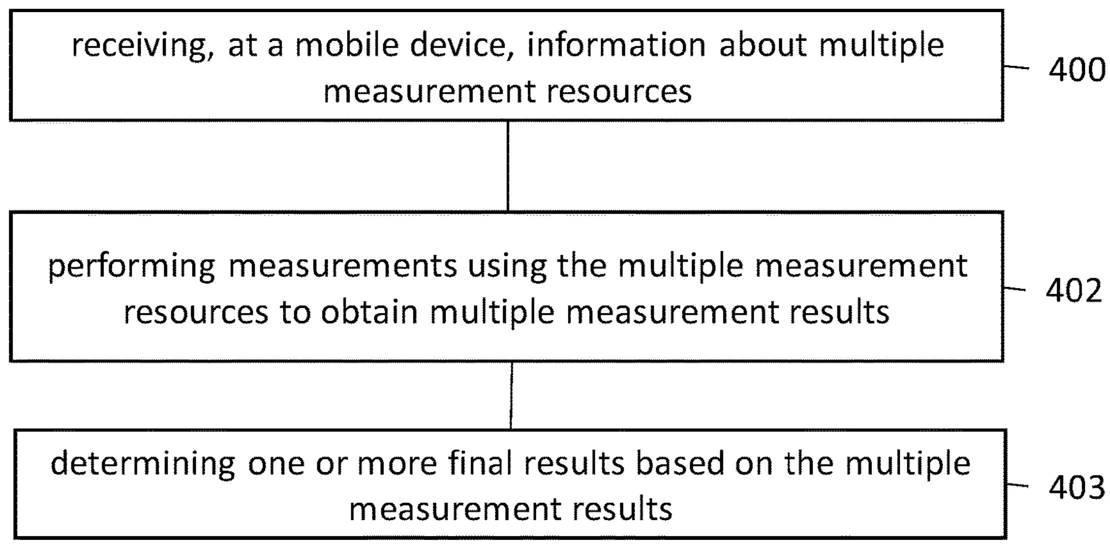
FIG. 4 is a flowchart representation of yet another method for wireless communication.

FIG. 4 is a flowchart representation of a method 400 for wireless communication. The method 400 includes, at 401, receiving, at a mobile device, information about multiple measurement resources from a communication node. The information indicates, for each of the multiple measurement resources, at least a frequency at which a measurement is to be performed, a bandwidth of the measurement, a number of symbols of the measurement, a period of the measurement, a duration of the measurement, or a start time of the measurement. The method 400 includes, at step 402, performing measurements by the mobile device using the multiple measurement resources to obtain multiple measurement results. The method 400 also includes, at 403, determining, by the mobile device, one or more final results based on the multiple measurement results.

In some embodiments, the UE performs the measurements using the configured measurement resources. For each of the measurement resource, the UE can obtain a measurement result. The UE can generate a common measurement result based on the measurement results associated with the same identity. For example, the UE can generate a measurement result as follows:

1. Cell common result. Given a particular cell (e.g., a cell ID included in the report configuration or the triggered report command), the UE can choose the best measurement result. The UE can also choose the average or the average of N (N>=2) best measurement results associated with the same cell identity as the cell common result.
2. Frequency-based common result. Given a particular frequency (e.g., a frequency identity, a measurement object identity, or a measurement identity in the report configuration or the triggered report command), the UE can choose the best measurement result. The UE can also choose the average or the average of N (N>=2) best measurement results associated with the same frequency identity as the frequency common result.
3. BWP-based common result. Given a particular BWP (e.g., a BWP ID included in the report configuration or the triggered report command), the UE can choose the best measurement result. The UE also choose the average or the average of N (N>=2) best measurement results associated with the same BWP identity as the BWP common results.
4. Resource-based or channel-based result. Given a particular resource (e.g., a resource ID or a channel ID included in the report configuration or the triggered report command), the UE can obtain measurement results associated with the same resource or channel identity as the resource or channel results.

After obtaining the measurement results, If the cell (e.g., the cell identity), the BWP (e.g., the BWP identity), the frequency (e.g., the frequency identity, the measurement object identity, or the measurement identity), or the channel (e.g., the channel identity or the resource identity) is indicated in the network-triggered reporting, UE can report the results and the corresponding identity via the Physical Uplink Control Channel (PUCCH), the MAC Protocol Data Unit (PDU), or RRC. If the corresponding cell (e.g., the cell identity), the BWP (e.g., the BWP identity), the frequency (e.g., the frequency identity, the a measurement object identity, the measurement identity), or the channel (e.g., the channel identity or the resource identity) is indicated in the reporting configuration, when the measurement result of corresponding frequency or the measurement object reaches the triggering condition (e.g., a period or an event), the UE can report the measurement results and the corresponding identity.

It is noted that the techniques described above are also applicable to the measurement of other signals or indicators such as the Reference Signal Received Power (RSRP), the Reference Signal Received Quality (RSRQ), the Signal to Interference plus Noise Ratio (SINR), etc.

Embodiment 3

Due to the unplanned and shared characteristic of the unlicensed spectrum, multiple operators may share the same spectrum in a region. For example, there may be multiple cells in a frequency. These cells may belong to different public land mobile networks (PLMNs).

During cell selection, the UE can measure multiple cells under one frequency and obtain multiple measurement results. UE then ranks all the measurement results that it has obtained. UE may select the highest-ranking cell and camp on it. However, after the UE reads the system information of the highest-ranking cell, UE may discover that it may not belong to the PLMN that UE has selected or registered.

In the legacy procedure, if the highest-ranking cell (or the best cell according to an absolute priority reselection rule) is an intra-frequency or inter-frequency cell that is not suitable because it belongs to a PLMN not equivalent to the registered PLMN, the UE will not consider this cell and other cells that operate on the same frequency as candidates for cell section for a maximum of 300 seconds.

When the carrier is shared by multiple operators, the legacy procedure may introduce inefficiency. For example, because the UE excludes all the cells that operate on the same frequency for a maximum of 300 seconds, the best cell that belongs to the selected PLMN on this frequency is also excluded. Furthermore, if the UE attempts to camp on the highest-ranking cell again after 300 seconds (e.g., the maximum delay), it will bring too much delay.

In some embodiments, the UE can lower the priority of the highest-ranking cell and other cells that operate at the same frequency for a predefined amount of time (e.g., 300 seconds). Lowering the priority of other cells that operate on the same frequency does not bar the UE from selecting one of these cells, thereby accelerating the cell selection process. For example, in some implementations, the UE can perform one of the following:

1. The UE can lower the priority of the highest-ranking cell and other cells that operate on the same frequency as candidates for reselection for a maximum of 300 seconds.
2. The UE can minimize the priority of the highest-ranking cell and other cells that operate on the same frequency as candidates for reselection for a maximum of 300 seconds.
3. The UE can lower the priority of the highest-ranking cell as a candidate for reselection for a maximum of 300 seconds. The priority of other cells that operate on the same frequency remain unchanged.
4. The UE can exclude the highest-ranking cell for a maximum of 300 seconds. The priority of other cells that operate on the same frequency remain unchanged.

Figure 5:
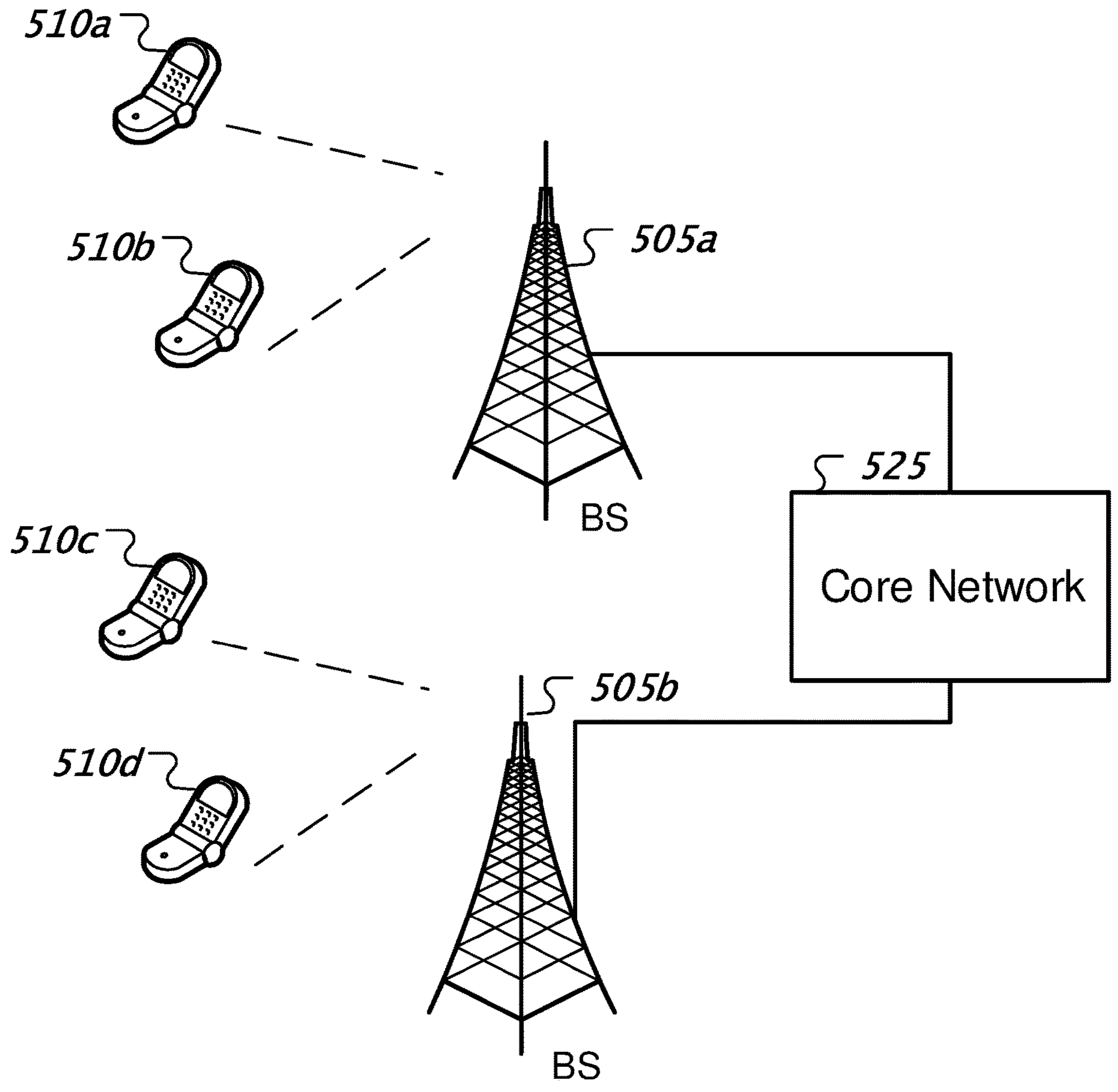
FIG. 5 shows an example of a wireless communication system where techniques in accordance with one or more embodiments of the present technology can be applied.

FIG. 5 shows an example of a wireless communication system 500 where techniques in accordance with one or more embodiments of the present technology can be applied. A wireless communication system 500 can include one or more base stations (BSs) 505*a*, 505*b*, one or more wireless devices 510*a*, 510*b*, 510*c*, 510*d*, and a core network 525. A base station 505*a*, 505*b* can provide wireless service to wireless devices 510*a*, 510*b*, 510*c* and 510*d* in one or more wireless sectors. In some implementations, a base station 505*a*, 505*b* includes directional antennas to produce two or more directional beams to provide wireless coverage in different sectors.

The core network 525 can communicate with one or more base stations 505*a*, 505*b*. The core network 525 provides connectivity with other wireless communication systems and wired communication systems. The core network may include one or more service subscription databases to store information related to the subscribed wireless devices 510*a*, 510*b*, 510*c*, and 510*d*. A first base station 505*a* can provide wireless service based on a first radio access technology, whereas a second base station 505*b* can provide wireless service based on a second radio access technology. The base stations 505*a* and 505*b* may be co-located or may be separately installed in the field according to the deployment scenario. The wireless devices 510*a*, 510*b*, 510*c*, and 510*d* can support multiple different radio access technologies.

Embodiment 4

In some embodiments, a wireless communication system can include multiple networks using different wireless technologies. A dual-mode or multi-mode wireless device includes two or more wireless technologies that could be used to connect to different wireless networks. Due to the coexistence of multiple wireless technologies, one wireless technology may cause interference on another wireless technology. Some UE can adopt the in-device coexistence (IDC) indication procedure to address the interference problem in the connected mode. In the IDC indication procedure, the UE can report the affected carrier frequencies.

The UE can perform the IDC indication procedure after the RRC reconfiguration procedure. For example, the UE can measure on the configured frequency, find out the affected carrier frequencies, and then report them to the communication node. However, in the idle mode, UE can also measure on the frequencies. During the measurement, UE may discover the affected carrier frequencies. If UE report the affected carrier frequencies to the communication node, the communication node can configure the inter-frequency and intra frequency for the UE to avoid interference.

To optimize this procedure, UE can report the affected carrier frequencies to the communication node when it enters the connected mode. For example, the RRC message RRCConnectionSetupComplete, RRCConnectionReestablishmentComplete, or RRCConnectionResumeComplete can include one or more fields to indicate the affected carrier frequencies, the time-division multiplexing information, or the transmission power expected by the UE.

Figure 6:
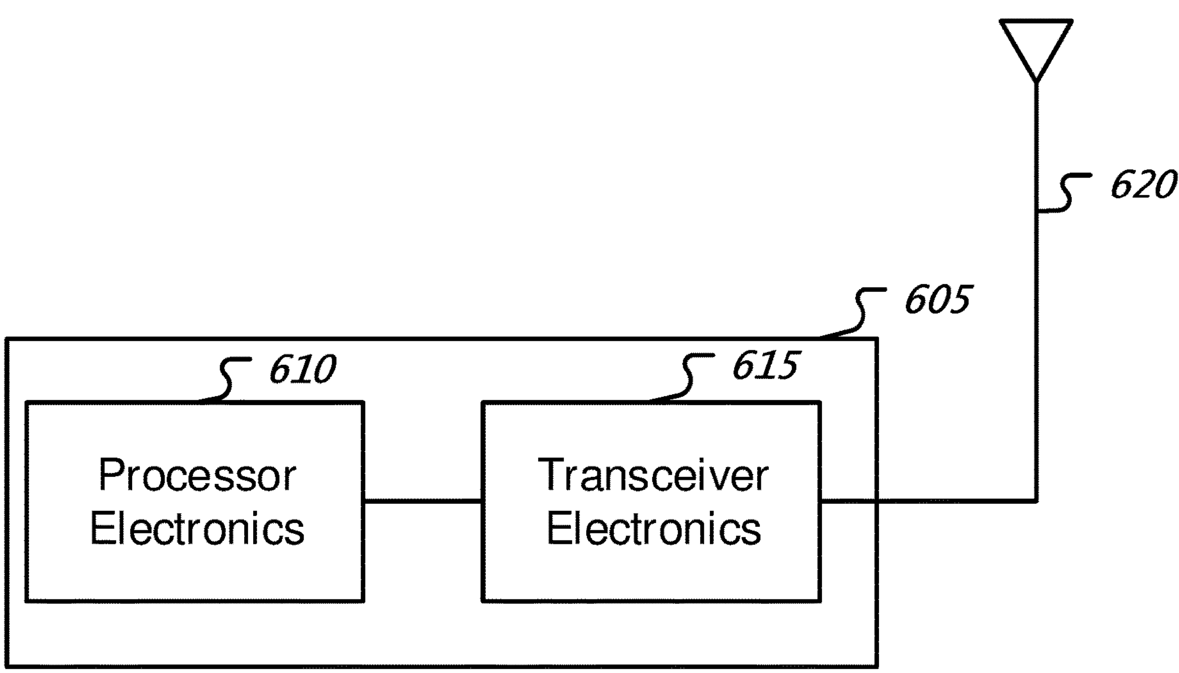
FIG. 6 is a block diagram representation of a portion of a radio station in accordance with one or more embodiments of the present technology can be applied.

FIG. 6 is a block diagram representation of a portion of a radio station. A radio station 605 such as a base station or a wireless device (or UE) can include processor electronics 610 such as a microprocessor that implements one or more of the wireless techniques presented in this document. The radio station 605 can include transceiver electronics 615 to send and/or receive wireless signals over one or more communication interfaces such as antenna 620. The radio station 605 can include other communication interfaces for transmitting and receiving data. Radio station 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the radio station 605.

It will be appreciated that the present document discloses techniques that can be embodied into wireless communication systems to multiple transmission occasions of essential information to be indicated at the same time, thereby improving the reliability of the transmissions using contention-based protocols in the unlicensed spectrum. The present document further discloses techniques that can be used in different embodiments to improve the measurement framework to account for different interferences over different channels in the unlicensed spectrum.

In one example aspect, a method for wireless communications includes transmitting, from a communication node, a message to a mobile device including information about a first transmission occasion. The information about the first transmission occasion indicates information about one or more additional transmission occasions. The method also includes performing, by the communication node, a subsequent transmission using either the first transmission occasion or the one of the one or more additional transmission occasions.

In some embodiments, information about the one or more transmission occasions indicates at least a frequency of a second transmission occasion. In some implementations, the information about the one or more transmission occasions includes a value indicating one of: a frequency offset between the frequency of the second transmission occasion and the frequency of the first transmission occasion, a frequency offset between the frequency of the second transmission occasion and a frequency of an associated synchronization signal or an associated discovery signal, a frequency offset between the frequency of the second transmission occasion and a carrier frequency, or an absolute frequency of the second transmission occasion.

In another example aspect, a method for wireless communications includes receiving, at a mobile device, a message from a communication node including information of a first transmission occasion. The information about the first transmission occasion indicates information of one or more additional transmission occasions. The method also includes receiving, by the mobile device, a subsequent transmission over either the first transmission occasion or the one of the one or more additional transmission occasions.

In some embodiments, the information about the one or more transmission occasions indicates at least a frequency of a second transmission occasion. In some implementations, the information about the one or more transmission occasions includes a value indicating one of: a frequency offset between the frequency of the second transmission occasion and the frequency of the first transmission occasion, a frequency offset between the frequency of the second transmission occasion and a frequency of an associated synchronization signal or an associated discovery signal, a frequency offset between the frequency of the second transmission occasion and a carrier frequency, or an absolute frequency of the second transmission occasion.

In another example aspect, a method for wireless communications includes transmitting, by a communication node, information about multiple measurement resources to a mobile device. The information indicates, for each of the multiple measurement resources, at least a frequency at which a measurement to be performed, a bandwidth of the measurement, a number of symbols for the measurement, a period of the measurement, a duration of the measurement, or a start time of the measurement.

In some embodiments, each measurement resource is associated with a corresponding measurement object. In some embodiments, the multiple measurement resources are associated with a measurement object.

In some embodiments, each of the multiple measurement resource is associated with a corresponding measurement identity. The measurement identity can include at least a channel identity, a resource identity, a bandwidth part identity, or a cell identity.

In another example aspect, a method for wireless communications includes receiving, at a mobile device, information about multiple measurement resources from a communication node. The information indicates, for each of the multiple measurement resources, at least a frequency at which a measurement is to be performed, a bandwidth of the measurement, a number of symbols of the measurement, a period of the measurement, a duration of the measurement, or a start time of the measurement. The method includes performing measurements by the mobile device using the multiple measurement resources to obtain multiple measurement result; and determining, by the mobile device, one or more final results based on the multiple measurement results.

In some embodiments, the method includes selecting, by the mobile device, a subset of the multiple measurement resources based on a capability of the mobile device. In some embodiments, each of the multiple measurement resource is associated with a corresponding measurement identity. The measurement identity can include at least a channel identity, a resource identity, a bandwidth part identity, or a cell identity.

In some embodiments, determining the one or more final results includes determining, by the mobile device, a frequency common result based on measurement results associated with a frequency indicated by the communication node. In some embodiments, determining the one or more final results includes determining, by the mobile device, a cell common result based on measurement results associated with a cell identity indicated by the communication node. In some embodiments, determining the one or more final results includes determining, by the mobile device, a bandwidth part common result based on measurement results associated with a bandwidth part identity indicated by the communication node.

In some embodiments, the method includes ranking, by the mobile device, the multiple measurement results to determine a highest-ranking cell, determining that the highest-ranking cell is not suitable for selection, and lowering a priority of the highest-ranking cell for a predefined amount of time. In some implementations, the method includes lowering a priority of one or more other cells that operate at a same frequency as the highest-ranking cell. In some implementations, the method includes maintaining a priority of one or more other cells that operate at a same frequency as the highest-ranking cell.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communications, comprising:

transmitting, by a communication node, information about multiple measurement resources to a mobile device, wherein the information indicates, for each of the multiple measurement resources, a frequency at which a measurement to be performed, and wherein the information is configured to cause the mobile device to perform operations including:

performing, during a cell selection, measurements on multiple cells under one frequency using the multiple measurement resources to obtain multiple measurement results;

determining one or more final results based on the multiple measurement results;

ranking the multiple measurement results to determine a highest-ranking cell; and determining that the highest-ranking cell is not suitable for a selection due to the highest-ranking cell belonging to another public land mobile network (PLMN) different from a PLMN that the mobile device has registered; and in response to the determining that the highest-ranking cell is not suitable, lowering a priority of the highest-ranking cell and one or more other cells that operate at a same frequency for a predefined amount of time, wherein the lowering of the priority does not bar the mobile device from selecting the one or more other cells that operate at the same frequency.

2. The method of claim 1, wherein at least one measurement resource is associated with a corresponding measurement object.

3. The method of claim 1, wherein each of the multiple measurement resources is associated with a corresponding measurement identity that includes at least one of a channel identity, a resource identity, a bandwidth part identity, or a cell identity.

4. The method of claim 1, wherein the mobile device is configured to select a subset of the multiple measurement resources based on a capability of the mobile device, and wherein the mobile device is further configured to determine a common result based on measurement results associated with a corresponding characteristic indicated by the communication node, the common result comprising a frequency common result associated with a same frequency identity or a cell common result associated with a same cell identity.

5. A method for wireless communications, comprising:

receiving, at a mobile device, information about multiple measurement resources from a communication node, wherein the information indicates, for each of the multiple measurement resources, a frequency at which a measurement is to be performed, and;

performing, during a cell selection, measurements on multiple cells under one frequency by the mobile device using the multiple measurement resources to obtain multiple measurement results;

determining, by the mobile device, one or more final results based on the multiple measurement results;

ranking, by the mobile device, the multiple measurement results to determine a highest- ranking cell;

determining that the highest-ranking cell is not suitable for a selection due to the highest- ranking cell belonging to another public land mobile network (PLMN) different from a PLMN that the mobile device has registered; and in response to the determining that the highest-ranking cell is not suitable, lowering a priority of the highest-ranking cell and one or more other cells that operate at a same frequency for a predefined amount of time, wherein the lowering of the priority does not bar the mobile device from selecting the one or more other cells that operate at the same frequency.

6. The method of claim 5, wherein each of the multiple measurement resources is associated with a corresponding measurement identity that includes at least one of a channel identity, a resource identity, a bandwidth part identity, or a cell identity.

7. The method of claim 5, wherein the method further comprises:

selecting, by the mobile device, a subset of the multiple measurement resources based on a capability of the mobile device, and determining a common result based on measurement results associated with a corresponding characteristic indicated by the communication node, the common result comprising a frequency common result associated with a same frequency identity or a cell common result associated with a same cell identity.

8. A wireless communication apparatus, comprising:

one or more processors configured to determine information about multiple measurement resources to a mobile device, wherein the information indicates, for each of the multiple measurement resources, a frequency at which a measurement to be performed, and a transmitter configured to transmit the information to a mobile device, wherein the information is configured to cause the mobile device to perform operations including:

performing, during a cell selection, measurements on multiple cells under one frequency using the multiple measurement resources to obtain multiple measurement results;

determining one or more final results based on the multiple measurement results;

ranking the multiple measurement results to determine a highest-ranking cell; and determining that the highest-ranking cell is not suitable for a selection due to the highest-ranking cell belonging to another public land mobile network (PLMN) different from a PLMN that the mobile device has registered; and in response to the determining that the highest-ranking cell is not suitable, lowering a priority of the highest-ranking cell and one or more other cells that operate at a same frequency for a predefined amount of time, wherein the lowering of the priority does not bar the mobile device from selecting the one or more other cells that operate at the same frequency.

9. The wireless communication apparatus of claim 8, wherein at least one measurement resource is associated with a corresponding measurement object.

10. The wireless communication apparatus of claim 8, wherein each of the multiple measurement resources is associated with a corresponding measurement identity that includes at least one of a channel identity, a resource identity, a bandwidth part identity, or a cell identity.

11. The wireless communication apparatus of claim 8, wherein the mobile device is configured to select a subset of the multiple measurement resources based on a capability of the mobile device, and wherein the mobile device is further configured to determine a common result based on measurement results associated with a corresponding characteristic indicated by the wireless communication apparatus, the common result comprising a frequency common result associated with a same frequency identity or a cell common result associated with a same cell identity.

12. A wireless communication apparatus, comprising:

a receiver configured to receive information about multiple measurement resources from a communication node, wherein the information indicates, for each of the multiple measurement resources, a frequency at which a measurement is to be performed, and one or more processors configured to:

perform, during a cell selection, measurements on multiple cells under one frequency using the multiple measurement resources to obtain multiple measurement results;

determine one or more final results based on the multiple measurement results;

rank the multiple measurement results to determine a highest-ranking cell;

determine that the highest-ranking cell is not suitable for a selection due to the highest-ranking cell belonging to another public land mobile network (PLMN) different from a PLMN that the wireless communication apparatus has registered; and in response to the determining that the highest-ranking cell is not suitable, lowering a priority of the highest-ranking cell and one or more other cells that operate at a same frequency for a predefined amount of time, wherein the lowering of the priority does not bar the wireless communication apparatus from selecting the one or more other cells that operate at the same frequency.

13. The wireless communication apparatus of claim 12, wherein each of the multiple measurement resources is associated with a corresponding measurement identity that includes at least one of a channel identity, a resource identity, a bandwidth part identity, or a cell identity.

14. The wireless communication apparatus of claim 12, wherein the one or more processors is configured to determine the one or more final results based on:

determining a common result based on measurement results associated with a corresponding characteristic indicated by the communication node, wherein the common result comprises at least one of: a frequency common result, a cell common result, or a bandwidth part common result, and wherein the corresponding characteristic comprises at least one of: a frequency, a cell identity, or a bandwidth part identity.

15. The wireless communication apparatus of claim 12, wherein the one or more processors is further configured to:

select a subset of the multiple measurement resources based on a capability of the processor, and determine a common result based on measurement results associated with a corresponding characteristic indicated by the communication node, the common result comprising a frequency common result associated with a same frequency identity or a cell common result associated with a same cell identity.

* * * * *